United States Patent
Tanoue et al.

(10) Patent No.: US 6,967,698 B2
(45) Date of Patent: Nov. 22, 2005

(54) PLANE LIGHT SOURCE APPARATUS

(75) Inventors: Yasuhiro Tanoue, Kusatsu (JP); Masayuki Shinohara, Nagaokakyo (JP); Junichi Takagi, Kyoto (JP); Junichiro Tsuji, Kusatsu (JP)

(73) Assignee: Omron Corporation, Kyoto (JP)

( * ) Notice: Subject to any disclaimer, the term of this patent is extended or adjusted under 35 U.S.C. 154(b) by 9 days.

(21) Appl. No.: 10/252,028

(22) Filed: Sep. 20, 2002

(65) Prior Publication Data

US 2003/0058382 A1 Mar. 27, 2003

(30) Foreign Application Priority Data

Sep. 21, 2001 (JP) .................................... 2001-290044

(51) Int. Cl.⁷ .............................................. G02F 1/1335
(52) U.S. Cl. ........................................ 349/62; 349/64
(58) Field of Search .................... 349/61–65; 362/31

(56) References Cited

U.S. PATENT DOCUMENTS 5,485,354 A * 1/1996 Ciupke et al. ............... 362/31
6,582,095 B1 * 6/2003 Toyoda ...................... 362/235
6,667,782 B1 * 12/2003 Taira et al. ................... 349/65
6,729,736 B2 5/2004 Umemoto .................... 362/31

FOREIGN PATENT DOCUMENTS

JP 05-196820 * 8/1993

* cited by examiner

Primary Examiner—Dung T. Nguyen

(74) Attorney, Agent, or Firm—Osha Liang LLP

(57) ABSTRACT

To make an efficiency of utilizing light with high efficiency in a plane light source apparatus used along with a liquid crystal display panel of a reflection type as a backlight, light f3 leaked from a rear face of a light guide plate 25 in a skewed direction, is incident on inside of a prism sheet 27 and reflected by a reflecting face 32. Light f3 reflected by the reflecting face 32, is reflected in a direction orthogonal to the prism sheet 27, passes the light guide plate 25 and is emitted from a light emitting face 30 of the light guide plate 25 in a direction orthogonally thereto.

5 Claims, 18 Drawing Sheets

"PRIOR ART"

"PRIOR ART"

FIG. 4 "PRIOR ART"

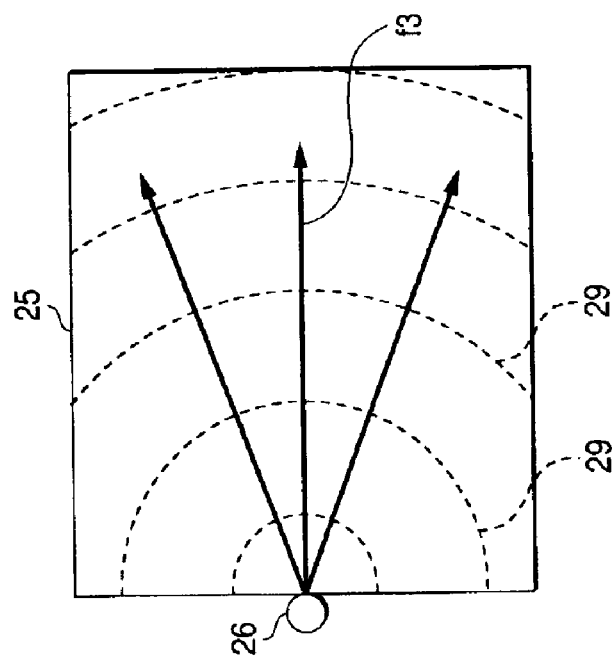
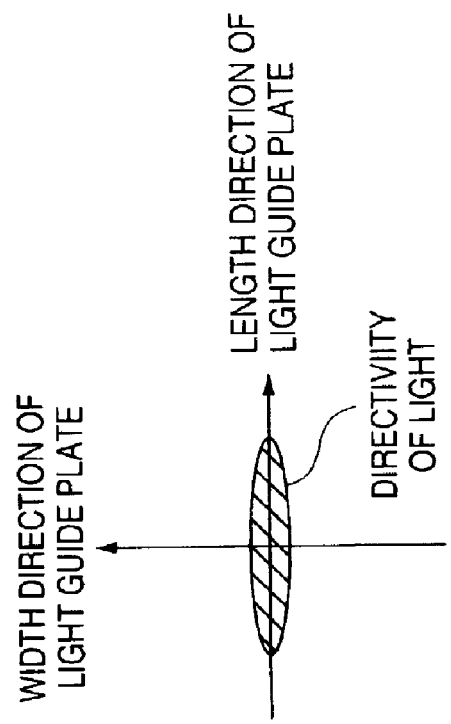
FIG. 14 (a)
FIG. 14 (b)

PLANE LIGHT SOURCE APPARATUS

BACKGROUND OF THE INVENTION

1. Field of the Invention

The present invention relates to a plane light source apparatus, particularly to a plane light source apparatus used as a backlight in an image display apparatus of a liquid crystal display apparatus or the like.

2. Description of the Related Art

FIG. 1 is a disassembled perspective view showing a structure of a plane light source apparatus 1 of a related art and FIG. 2 is a sectional view thereof. The plane light source apparatus 1 is constituted by a light emitting portion 2, a light guide plate 3, a reflecting plate 4 and a prism sheet 5. The light emitting portion 2 is mounted with a plurality of pieces of so-to-speak point light sources 7 of light emitting diodes or the like on a circuit board 6, and arranged opposedly along an end face (light incident end face 8) of the light guide plate 3. The light guide plate 3 is molded by a transparent resin having a large refractive index such as polycarbonate resin or methacrylic resin, and at a lower face (face on a side opposed to a light emitting face 9) of the light guide plate 3, there is formed a diffusing pattern 10 by recessed and projected forming, dot printing of diffusing and reflecting ink or the like. The reflecting plate 4 is formed by, for example, a white resin sheet having high reflectance and both end portions of the reflecting plate 4 are pasted to the lower face of the light guide plate 3 by a double coated tape 11. The prism sheet 5 is arranged with prism patterns 12 having a section in a triangular shape in parallel with each other and placed above the light emitting face 9 of the light guide plate 3.

Further, according to the plane light source apparatus 1, as shown by FIG. 2, light f1 emitted from the light emitting portion 2, is introduced from the light incident end face 8 of the light guide plate 3 to an inner portion of the light guide plate 3. The light f1 confined at inside of the light guide plate 3, progresses at the inner portion of the light guide plate 3 while repeating total reflection by an upper face and a lower face of the guide plate 3. At this occasion, when the light f1 incident on the diffusing pattern 10 and diffused and reflected by the diffusing pattern 10, is incident on the light emitting face 9 of the light guide plate 3 by an angle of incidence smaller than a critical angle of total reflection, as shown by FIG. 2, the light f1 is emitted from the light emitting face 9 to outside of the light guide plate 3. Light emitted skewedly from the light emitting face 9 of the light guide plate 3, passes the prism sheet 5 and is bent to a direction orthogonal to the plane light source apparatus 1 by the prism sheet 5. Further, the light f1 emitted from the lower face of the light guide plate 3 by passing a portion of the lower face of the light guide plate 3 where the diffusing pattern 10 is not present, returns to inside of the light guide plate 3 again by being reflected by the reflecting plate 4 to thereby prevent loss of an amount of light from the lower face of the light guide plate 3.

FIG. 3 is an outline view for explaining operation of the prism sheet 5 in the plane light source apparatus 1. In light diffused and reflected by the diffusing pattern 10, only light incident on the light emitting face 9 by an angle of incidence smaller than the critical angle of total reflection, is emitted from the light emitting face 9 of the light guide plate 3, further, since a diffusing degree of the diffusing pattern 10 is not so much large, the light f1 is emitted from the light emitting face 9 with a comparatively narrow directing angle in a direction inclined from a direction orthogonal to the light emitting face 9. Now, as shown by FIG. 3, considering a case in which the prism sheet 5 is opposed to the upper face of the light guide plate 3 by directing the prism pattern 12 to a side opposed to the light guide plate 3, light skewedly incident on the lower face of the prism sheet 5, is refracted in a direction substantially orthogonal to the prism sheet 5 by refracting operation of the prism pattern 12. As a result, light passing the prism sheet 5, is emitted in the direction substantially orthogonal to the prism sheet 5. FIG. 5 is a graph showing a relationship between an angle of emittance from the prism sheet 5 and a brightness (rate) by constituting a reference by the direction orthogonal to the prism sheet 5, and a bold line curve C1 in FIG. 5 shows a relationship between the angle of emittance and the brightness when the prism pattern 12 is arranged to direct to the side opposed to the light guide plate 3 as shown by FIG. 3.

Further, as shown by FIG. 4, even when the prism sheet 5 is made to be opposed to the upper face of the light guide plate 3 by directing the prism pattern 12 having an apex angle of 60° to the side of the light guide plate 3, light skewedly incident on the prism pattern 12 on the lower face of the prism sheet 5, is refracted in the direction substantially orthogonal to the prism sheet 5 by refracting operation of the prism pattern 12. A relationship between the angle of emittance and the brightness in the case of arranging the prism pattern 12 to direct to the side of the light guide plate 3 in this way, is as shown by a broken line curve C2 of FIG. 5.

Next, FIG. 6 is an outline sectional view showing a plane light source apparatus 13 having other structure. According to the plane light source apparatus 13, light f2 emitted from a light emitting portion and incident on inside of a light guide plate 14 is propagated in the light guide plate 14 while repeating total reflection between an upper face and a lower face of the light guide plate 14. The lower face of the light guide plate 14 is formed with a reflecting pattern 15 in a shape of a triangular prism, and as in light f2 shown in FIG. 6, the light f2 reflected (total reflection or mirror reflection) twice by the lower face of the light guide plate 14, is emitted orthogonally from the upper face (light emitting face 16) of the light guide plate 14.

When a plane light source apparatus is used as a backlight of a liquid crystal display panel, a viewing angle easy to see an image of particularly, a liquid crystal display panel is said to be about 30° (±15°). However, according to the plane light source apparatus as shown by FIGS. 1 through 3 and the plane light source apparatus as shown by FIG. 4, a directing property of light emitted from the prism pattern 12 is wide as in the bold line curve C1 or the broken line curve C2 shown in FIG. 5 and light is emitted in other than the direction orthogonal to the prism pattern 12 and loss of light is considerable.

For example, according to the plane light source apparatus as shown by FIG. 1 through FIG. 3, as shown by FIG. 7, in order to constitute a spreading angle of light passing through the prism sheet 5 by 30°, it is necessary that a spreading angle of light emitted from the light guide plate 3 is set to about 20°. According to the plane light source apparatus disposed with prism sheet 5 as shown in FIG. 4, in order to constitute a spreading angle of light passing through the prism sheet 5 by 30°, it is necessary that also a spreading angle of light emitted from the light guide plate 3 is set to about 30°. However, actually, according to the plane light source apparatus, the directing property is as wide as shown by FIG. 5 and particularly, light emitted to outside of the viewing angle easy to see, constitutes the loss.

Further, according to a liquid crystal display apparatus using the plane light source apparatus placing the prism sheet 5 above the upper face of the light guide plate 3 as shown by FIG. 3 or FIG. 4 and overlapping a liquid crystal display panel thereabove, the prism sheet 5 is disposed right under the liquid crystal display panel and therefore, there is brought about a drawback that a defect having a size of about 0.1 mm of the prism sheet 5 is seen. Further, since the prism sheet 5 is disposed below the liquid crystal display panel, there is a high concern of producing Moire fringes between pixels of the liquid crystal display panel and the prism pattern 12 of the prism sheet 5.

Further, according to the plane light source apparatus 13 having the structure as shown by FIG. 6, as shown by FIG. 9, light f2 leaked from the lower face of the light guide plate 14 can be returned into the light guide plate 14 again by reflecting the light by a reflecting plate 17 laid at the lower face of the light guide plate 14. However, when the light f2 which has returned into the light guide plate 14, passes the light guide plate 14, the light f2 is emitted in a skewed direction from the upper face of the light guide plate 14 and is not emitted in the direction orthogonal to the light guide plate 14 to thereby constitute the loss.

Therefore, according to the plane light source apparatus of the related art, an efficiency of utilizing light emitted from the light emitting portion is not sufficient and a plane light source apparatus having a higher efficiency is requested.

SUMMARY OF THE INVENTION

It is an object of the invention to provide a plane optical source apparatus having a higher efficiency.

According to an aspect of the invention, there is provided a plane light source apparatus comprising a light source, and a light guide plate for confining light from the light source and emitting the light from a surface thereof, wherein an optical sheet for reflecting light emitted from a rear face of the light guide plate in a skewed direction and making the light incident on the rear face of the light guide plate again orthogonally to the rear face is arranged opposedly to the rear face of the light guide plate. In this case, the skewed direction is a direction inclined from a direction orthogonal to the rear face of the light guide plate.

According to the plane light source apparatus of the invention, the optical sheet for reflecting light emitted from the rear face of the light guide plate in the skewed direction and making the light incident on the rear face of the light guide plate orthogonally thereto, is arranged opposedly to the rear face of the light guide plate and therefore, light leaked from the rear face of the light guide plate can be reflected into a viewing angle, light which has been reflected outside of the viewing angle in the related art can be condensed into the viewing angle and an efficiency of utilizing light can be increased.

Further, according to the plane light source apparatus, when the plane light source apparatus is arranged on a rear side of an image display panel, the optical sheet is disposed at a position remotest from the image display panel and therefore, even when there is a defect in the optical sheet, the defect is made to be difficult to see and Moire fringes are made to be difficult to be brought about between the image display panel and the optical sheet.

An embodiment according to the plane light source apparatus of the invention, is featured in that the optical sheet is formed with a recessed and projected pattern on a face thereof on a side opposed to a face thereof opposed to the light guide plate, and the face formed with the recessed and projected pattern defines a light reflecting face. According to the embodiment, light is reflected by the reflecting face comprising the recessed and projected pattern and therefore, a direction of reflecting light can be controlled by a shape or an angle of inclination of the recessed and projected pattern.

Particularly, the light reflecting face may be produced by forming a metal thin film on the face formed with the recess and projected pattern. According to the embodiment, since light incident on the optical sheet can be reflected by the light reflecting face comprising the metal thin plate and returned to the side of the light guide plate and therefore, light can be reflected more firmly than reflecting light by utilizing total reflection. Therefore, there is not leakage of light from the rear face of the optical sheet and the light utilizing efficiency can further be promoted.

Other embodiment according to the plane light source apparatus of the invention is featured in that the light reflected by the optical sheet and made incident on the rear face of the light guide plate again, is emitted from a surface of the light guide plate in a direction substantially orthogonal to the surface of the light guide plate. Light made to be incident on the rear face of the light guide plate again substantially orthogonally thereto by the optical sheet, is emitted from the surface of the light guide plate substantially in the vertical direction and therefore, the efficiency of utilizing light can extremely be promoted thereby.

Still other embodiment according to the plane light source apparatus of the invention is featured in that the rear face of the light guide plate is discretely formed with a diffusing pattern for reflecting light in the light guide plate, and the light reflected by the diffusing pattern is emitted from the surface of the light guide plate in a direction substantially orthogonal to the surface of the light guide plate. According to the embodiment, also light reflected in the light guide plate is reflected by the diffusing pattern and emitted from the surface of the light guide plate substantially in the vertical direction and therefore, light can be condensed in a direction easy to see an image and the efficiency of utilizing light can further be promoted.

Still other embodiment according to the plane light source apparatus of the invention, is featured in that a directivity of reflected light reflected by the optical sheet becomes narrower than a directivity of incident light incident on the optical sheet. According to the embodiment, the directivity of light can be narrowed by reflecting light leaked from the light guide plate by the optical sheet and therefore, the efficiency of utilizing light can further be promoted.

Still other embodiment according to the plane light source apparatus of the invention, is featured in that a directivity of light propagating in the light guide plate is narrowed in one direction when viewed from a direction orthogonal to the surface of the light guide plate. According to the embodiment, the directivity of light propagating in the light guide plate is narrowed in one direction and therefore, also a directivity of light leaked from the rear face of the light guide plate is narrowed in the one direction and control of reflected light by the optical sheet is facilitated.

According to still other embodiment of the plane light source apparatus of the invention, the recessed and projected patterns formed at the optical sheet and the diffusing patterns formed at the light guide plate, may respectively be arranged in a shape of concentric circles centering on the light source (for example, point light source). Further, according to still other embodiment of the plane light source apparatus of the invention, it is preferable that in the case of a light source (so-to-speak line light source) extended along an end face of the light guide plate, the recessed and projected pattern formed at the optical sheet becomes a pattern in parallel with the light source.

Further, constituent elements of the invention explained above can be combined as arbitrarily as possible.

BRIEF DESCRIPTION OF THE DRAWINGS

FIG. 14(a) is a view showing a behavior of progressing of light at the diffusing pattern of the light guide plate and inside of the light guide plate, and FIG. 14(b) is a view showing a directivity of light emitted from a light emitting face of the light guide plate;

DETAILED DESCRIPTION OF THE PREFERRED EMBODIMENTS (First Embodiment)

Figure 1:
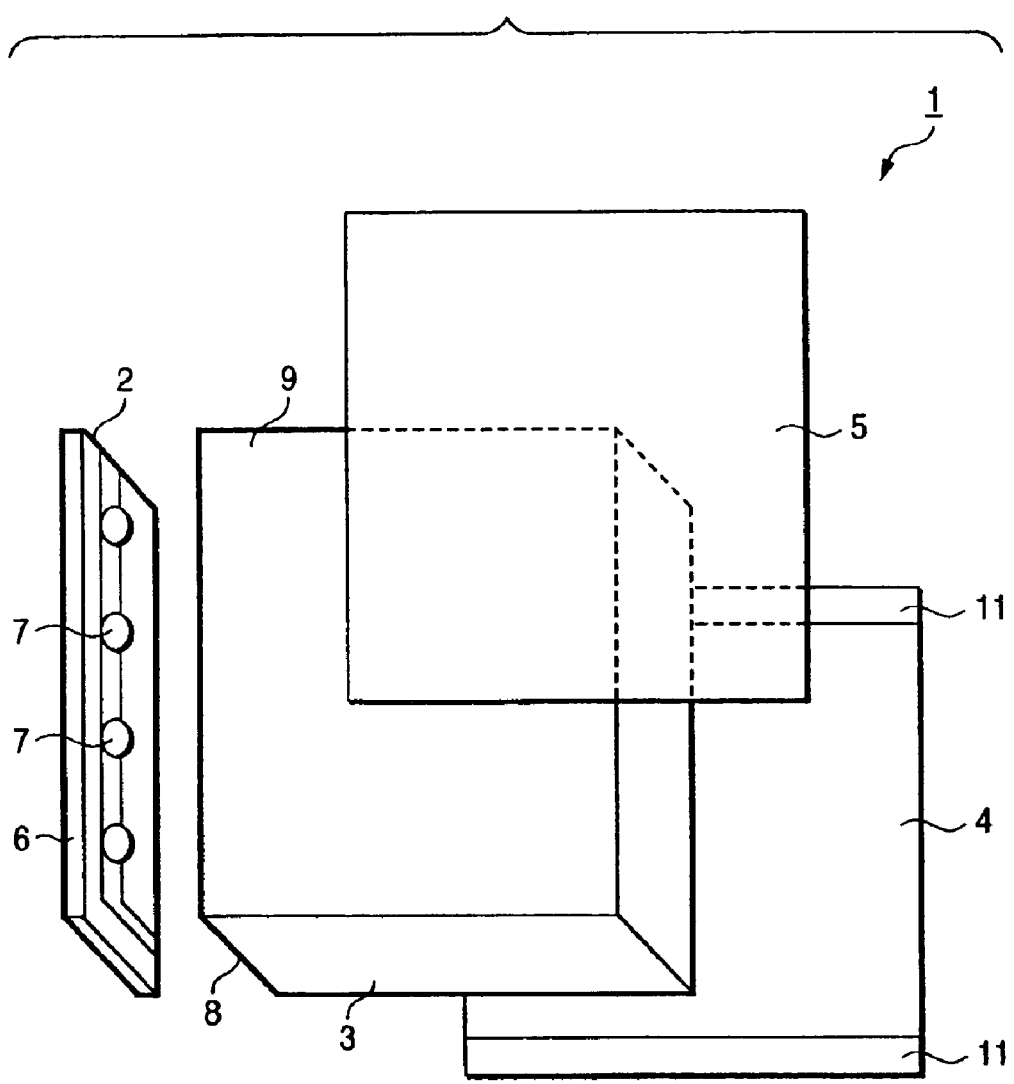
FIG. 1 is a disassembled perspective view showing a structure of a plane light source apparatus of a related art.
Figure 2:
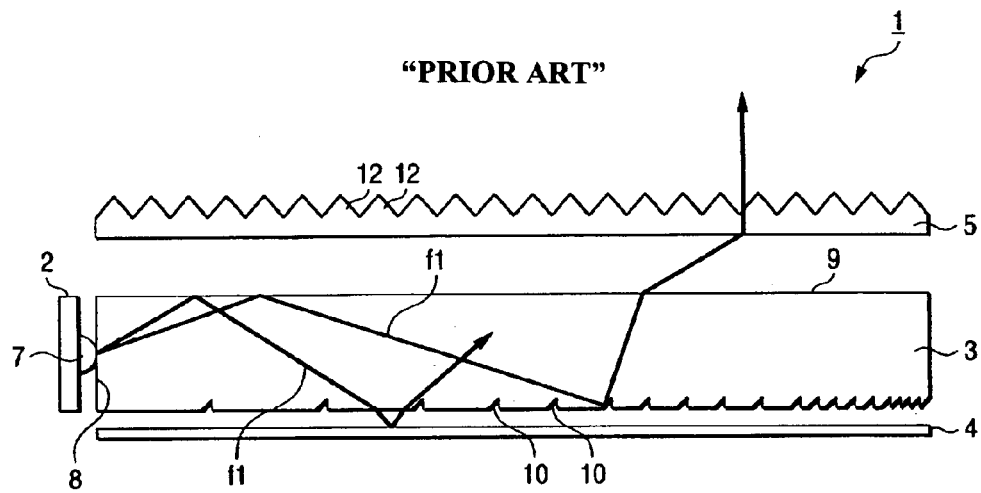
FIG. 2 is a sectional view of the plane light source apparatus of the same.
Figure 3:
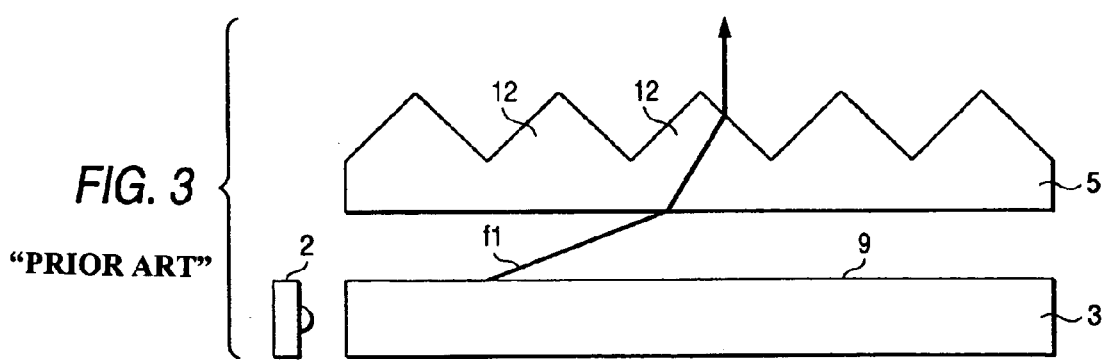
FIG. 3 is an outline view for explaining operation of a prism sheet in the plane light source apparatus of the same.
Figure 4:
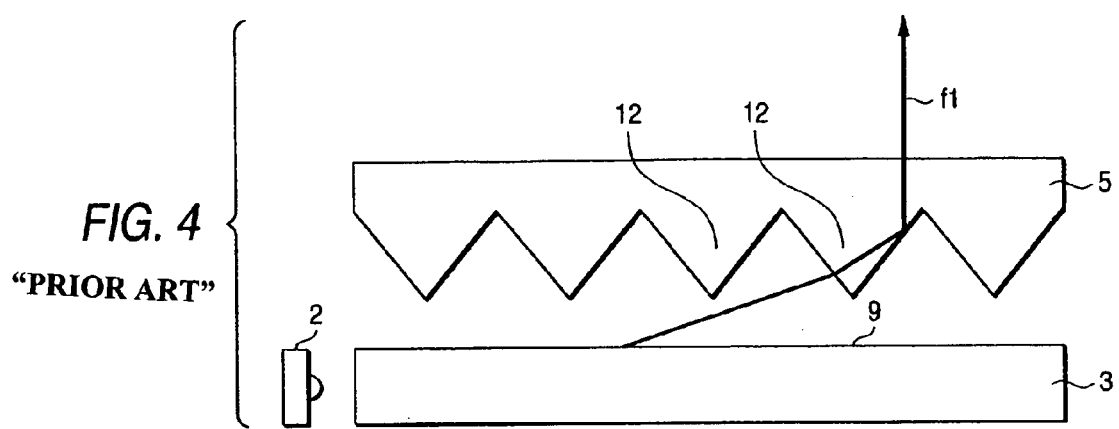
FIG. 4 is an outline view for explaining operation of a prism sheet in a plane light source apparatus having a different direction of a prism pattern.
Figure 5:
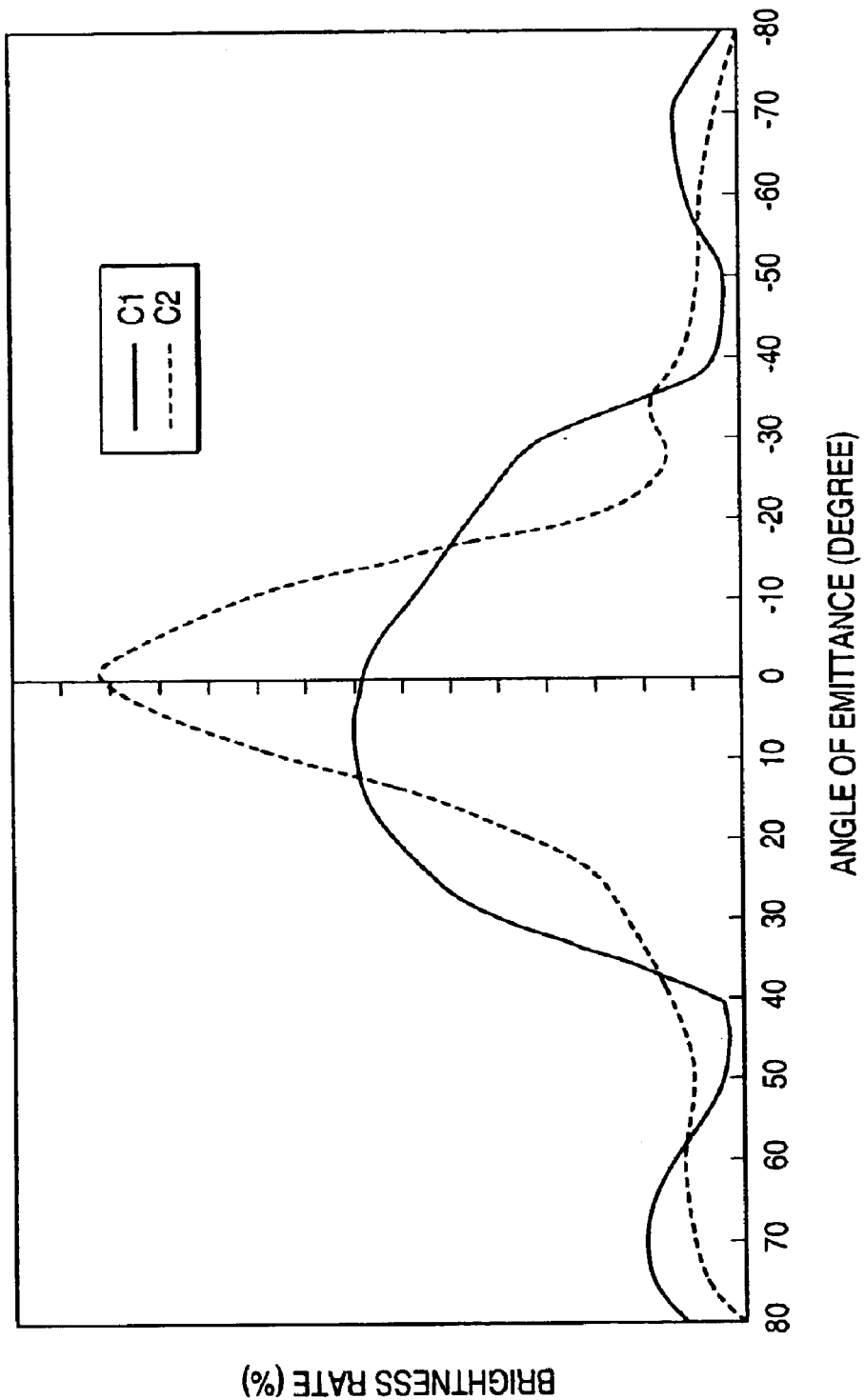
FIG. 5 is a graph showing a relationship between an angle of emittance from a prism sheet and a brightness (rate) constituting a reference by a direction orthogonal to the prism sheet, a bold line carbon C1 shows a relationship between the angle of emittance and the brightness when a prism pattern is arranged to direct to a side opposed to a light guide plate, and a broken line curve C2 shows a relationship between the angle of emittance and the brightness when the prism pattern is arranged to direct to a side of the light guide plate.
Figure 6:
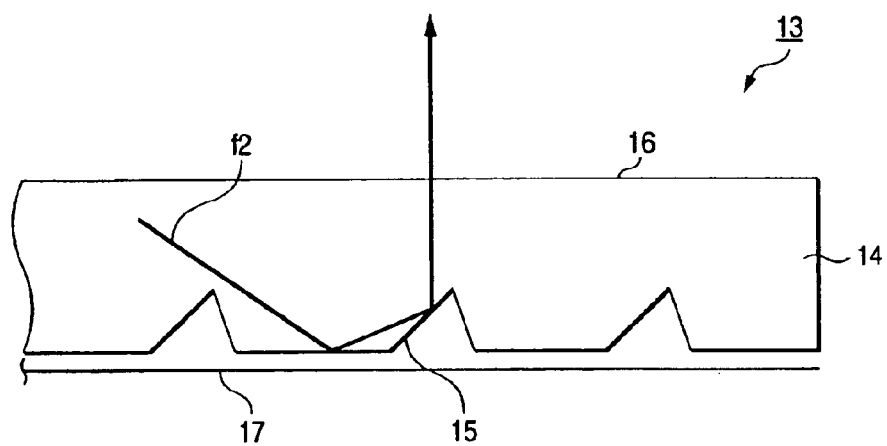
FIG. 6 is an outline sectional view showing a plane light source apparatus having other structure.
Figure 7:
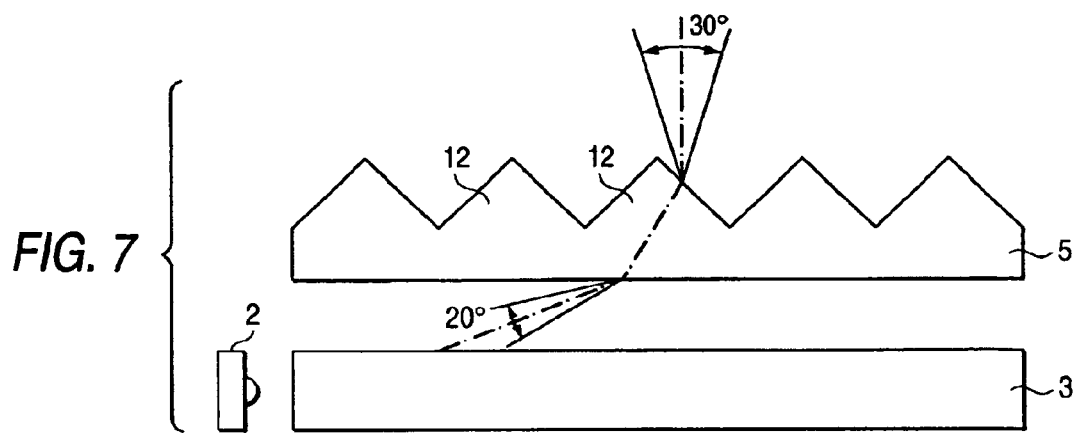
FIG. 7 is a view showing a relationship between a viewing angle of light incident on a prism sheet and a viewing angle of light emitted from the prism sheet when a prism pattern is directed to a side opposed to a light guide plate.
Figure 8:
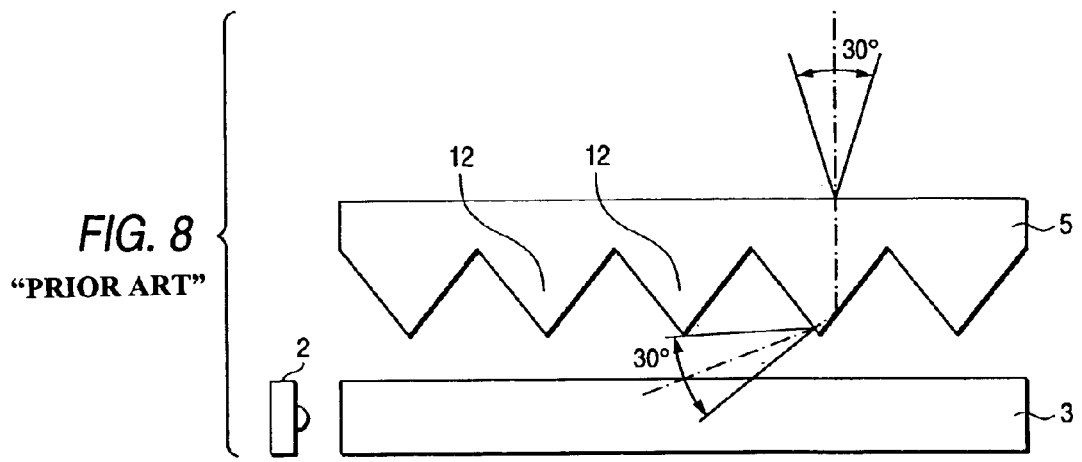
FIG. 8 is a view showing a relationship between a viewing angle of light incident on a prism sheet and a viewing angle of light emitted from the prism sheet when a prism pattern is directed to a side of a light guide plate.
Figure 9:
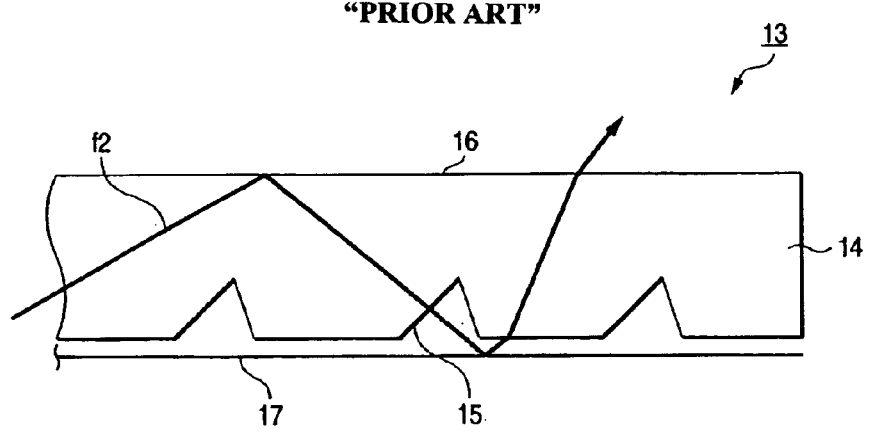
FIG. 9 is a view for explaining a behavior of light leaked from a lower face of a light guide plate in the plane light source apparatus shown in FIG. 6.
Figure 10:
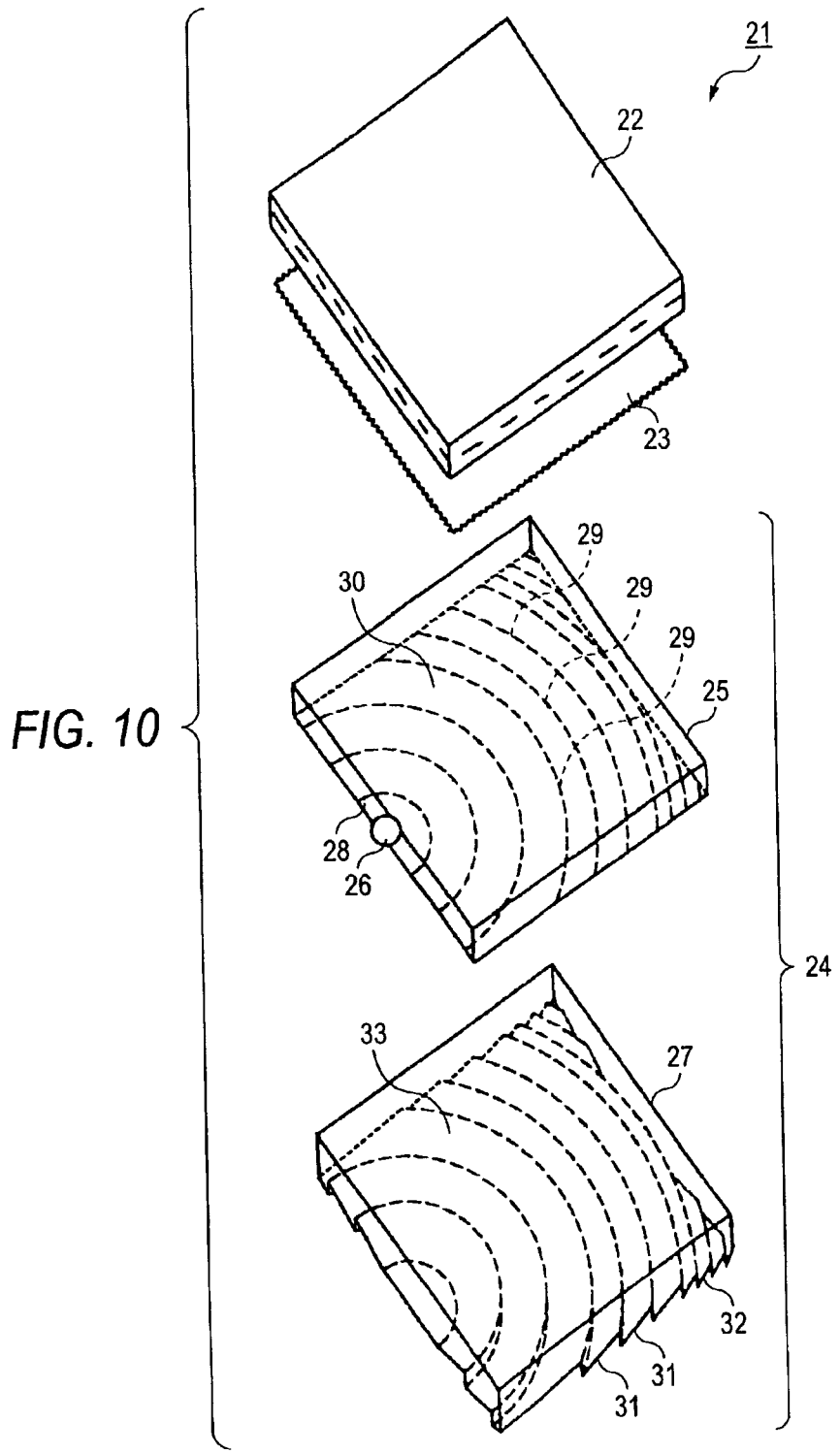
FIG. 10 is a disassembled perspective view showing a structure of a liquid crystal display apparatus according to an embodiment of the invention.
Figure 11:
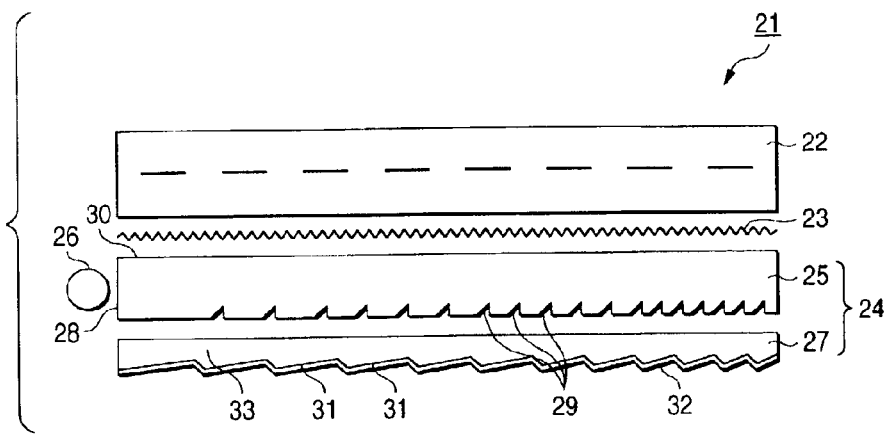
FIG. 11 is a sectional view of the liquid crystal display apparatus of the same.

FIG. 10 is a disassembled perspective view showing a structure of a liquid crystal display apparatus 21 according to an embodiment of the invention and FIG. 11 is a sectional view thereof. The liquid crystal display apparatus 21 comprises a liquid crystal display panel 22 of a transmission type, a diffusing plate 23 and a plane light source apparatus (backlight) 24, and the plane light source apparatus 24 is constituted by a light guide plate 25, a light emitting portion 26 and a prism sheet 27. The light emitting portion 26 is constituted by a so-to-speak point light source such as a light emitting diode (LED) or the like. The point light source needs not to be a single piece of a light emitting diode or the like but a plurality of pieces of light emitting diodes or the like may locally be present in areas smaller than a width of the light guide plate 25. Further, the light emitting portion 26 may be arranged to be opposed to a central portion of an end face (light incident end face 28) of the light guide plate 25 or may be embedded at an end portion of the light guide plate 25.

Figure 12:
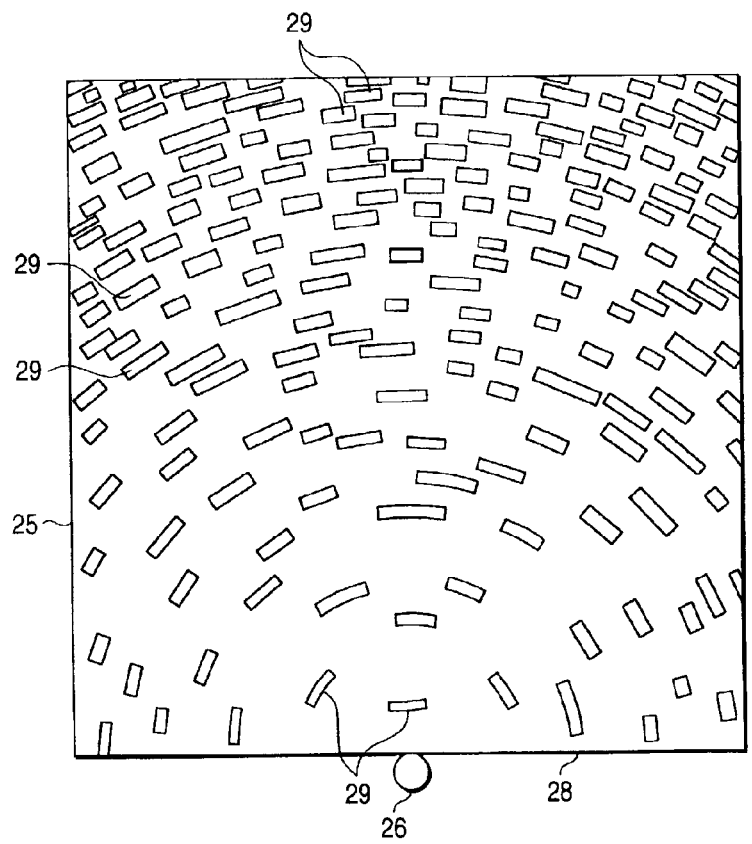
FIG. 12 is a view showing a diffusing pattern formed at a lower face of a light guide plate.

The light guide plate 25 is molded by a transparent resin material having a large refractive index of polycarbonate resin or methacrylic rein, and a lower face of the light guide plate 25 is formed with a number of diffusing patterns 29. As shown by FIG. 12, the diffusing patterns 29 are arranged in a shape of concentric circles centering on the light emitting portion 26. The diffusing pattern 29 is formed by a recessed portion having a section in a triangular shape or a section substantially in a semicircular shape (semicylindrical shape) formed at the lower face of the light guide plate 25, and the respective diffusing pattern 29 is extended in a direction orthogonal to a direction of line connecting the light emitting portion 26 and a position of arranging the diffusing pattern 29.

Figure 13:
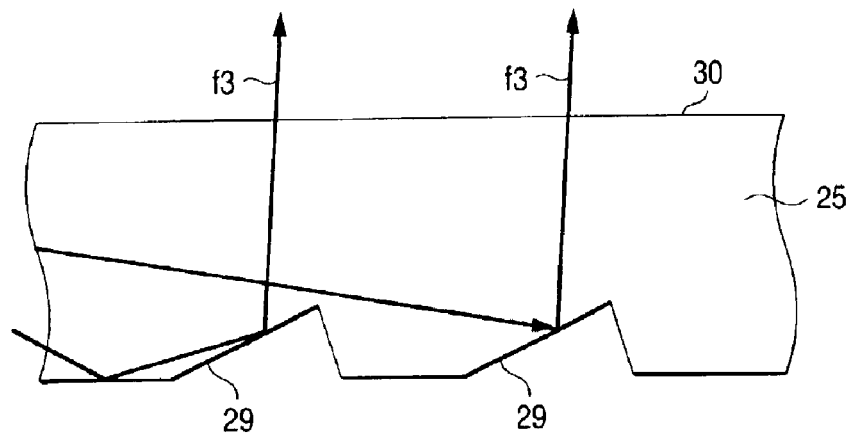
FIGS. 13(a) and 13(b) are views for explaining a behavior of light impinging on the diffusing pattern in the light guide plate.
Figure 13:
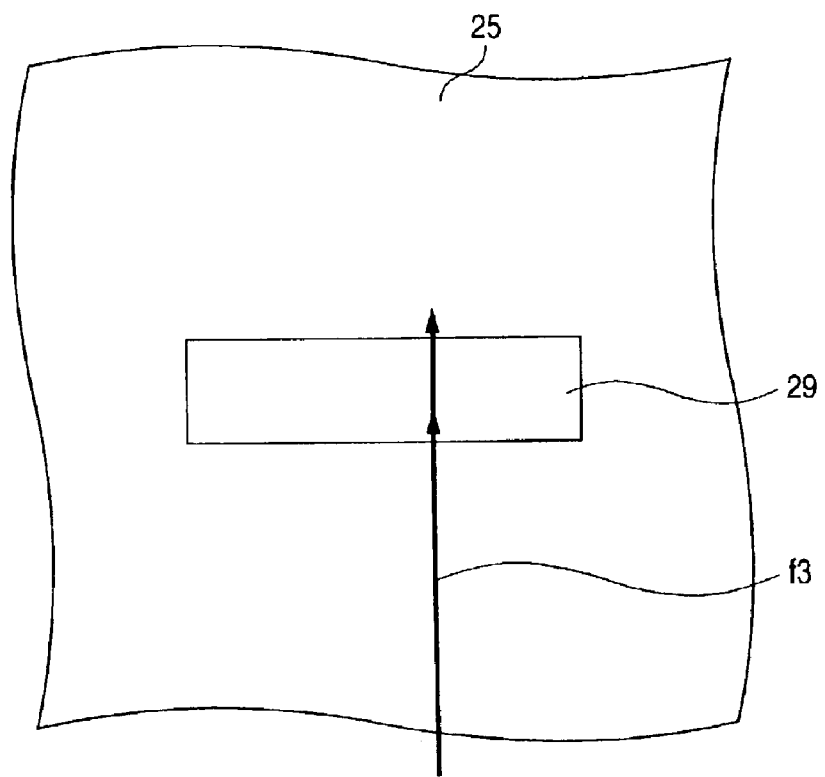

Further, light emitted from the light emitting portion 26 enters the light guide plate 25 from the light incident end face 28, is confined at inside of the light guide plate 25 and progresses at an inner portion of the light guide plate 25 while repeating total reflection by an upper face and the lower face of the light guide plate 25. As shown by FIGS. 13a and 13b, light f3 impinging on the diffusing pattern 29 at inside of the light guide plate 25, is reflected by an interface of the diffusing pattern 29, emitted toward a light emitting face 30 at a surface of the light guide plate 25 and is emitted from the light emitting face 30 to outside substantially orthogonally thereto by being incident on the light emitting face 30 by an angle of incidence smaller than a critical angle of total reflection. Or, as in light f3 shown in FIG. 13(a), light f3 is emitted toward the light emitting face 30 at the surface of the light guide plate 25 by being subjected to total reflection twice continuously by the lower face of the light guide plate 25, and is emitted from the light emitting face 30 in a direction substantially orthogonal thereto.

The individual diffusing patterns 29 are uniform in a circumferential direction centering on the light emitting portion 26 and therefore, as shown by FIG. 14(a), even when light incident on inside of the light guide plate 25, impinges on the diffusing pattern 29, in plane view, a progressing direction of light remains unchanged and in the circumferential direction centering on the light emitting portion 26, and there is not operation of diffusing light. Therefore, uniformity of light in the circumferential direction is determined only by a light amount distribution of the light emitting portion 26 in the circumferential direction, or a light amount distribution of light entering inside of the light guide plate 25 from the light incident end face 28. As a result, according to the plane light source apparatus 24, the directing property of light in the circumferential direction is narrowed and therefore, as shown by FIG. 14(b), a directivity of light emitted from the light emitting face 30 of the light guide plate 25 is extremely narrowed in a width direction of the light guide plate 25 and widened in a length direction thereof. In this way, when the light guide plate 25 is viewed in a direction orthogonally thereto, the directivity is narrowed in one direction (circumferential direction of the diffusing pattern 29) and therefore more light can be emitted vertically. A directing angle in the narrow direction is preferably ±15° through ±20° (30° through 40° as a whole) in view of easiness of seeing a screen of the liquid crystal display apparatus 21.

Light emitted from the light emitting portion 26 and incident on inside of the light guide plate 25, is widened radially in view from the direction orthogonal to the light guide plate 25 and therefore, an optical intensity is large at a vicinity of the light emitting portion 26, and the more remote from the light emitting portion 26, the smaller the optical intensity. Therefore, at an area proximate to the light emitting portion 26, a pattern density of the diffusing patterns 19 is reduced, at an area remote from the light emitting portion 26, the pattern density of the diffusing patterns 29 is increased to thereby make light easy to emit from the light emitting face 30, thereby, a distribution of light emitted from the light emitting face 30 of the light guide plate 25 is made uniform and a nonuniformity in brightness is made to be difficult to bring about.

Further, at a lower face (face on a side opposed to a face opposed to the light guide plate 25) of the prism sheet 27, as shown by FIG. 10 and FIG. 11, there are formed recessed and projected patterns 31 in a shape of a prism having a section in a triangular shape. The recessed and projected pattern 31 is formed in a circumferential shape centering on the light emitting portion 26 and the respective recessed and projected patterns 31 are formed in a shape of concentric circles at constant pitches. A total of the lower face of the prism sheet 27 is formed with a reflecting face 32 by a metal-deposited film vapor-deposited with Ag, Al, T, Au or the like.

Figure 15:
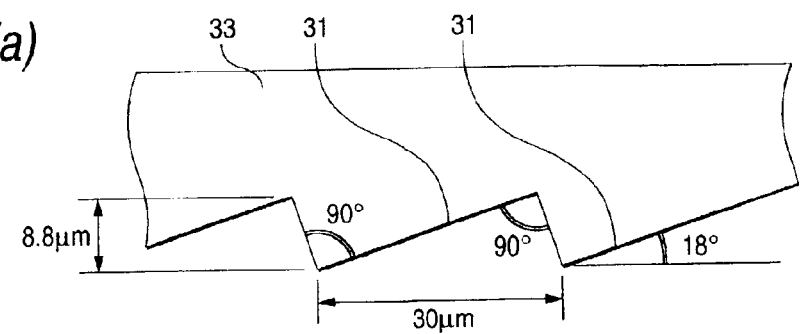
FIGS. 15(a) and 15(b) are a partially broken enlarged sectional view showing an example of a resin-molded portion of a prism sheet and a rear view thereof.
Figure 15:
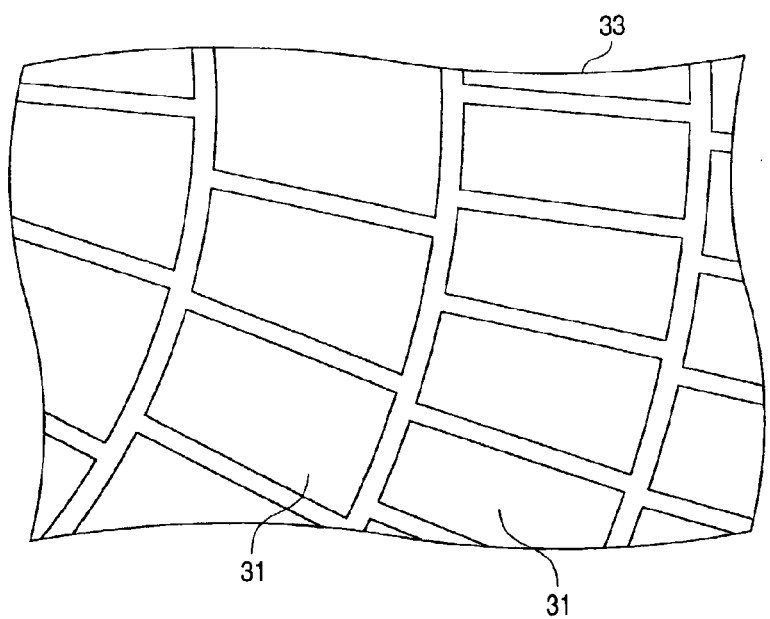

FIGS. 15(a) and 15(b) are a partially broken enlarged sectional view showing an example of a resin-molded portion 33 of a prism sheet 27 (prism sheet before forming the reflecting face 32) and a rear view thereof. The prism sheet 27 is formed with the recessed and projected patterns 31 having a depth of 8.8 $\mu$m in the shape of concentric circles and discretely at a period (pitch) of 30 $\mu$m, and an angle of inclination of the recessed and projected pattern 31 is 18° and an angle made by contiguous inclined faces thereof is 90° (that is, the recessed and projected pattern 31 is formed by a section in a shape of a rectangular triangle). Further, the numerical values are pointed out as an example and the invention is not limited to the numerical values.

According to the prism sheet 27 discretely formed with the recessed and projected patterns 31 as described above, it is preferable that one or more of the recessed and projected patterns 31 correspond to inside of one pixel of the liquid crystal display panel 22. By corresponding one or more of the recessed and projected patterns 31 to one pixel of the liquid crystal display panel 22, a dispersion of brightness among the respective pixels can be reduced. Further, it is preferable that the period of the recessed and projected pattern 31 is prevented from being a period of the diffusing pattern 29 (or, a period smaller than the period of the diffusing pattern 29) multiplied by an integer in order to prevent Moire fringes from being brought about by interfering with the diffusing patterns 29 of the light guideplate 25. Further, although in FIG. 15(b), there is shown the prism sheet 27 in which the recessed and projected patterns 31 are divided in the circumferential direction, the recessed and the projected patterns 31 may be continuous in the circumferential direction.

Figure 16:
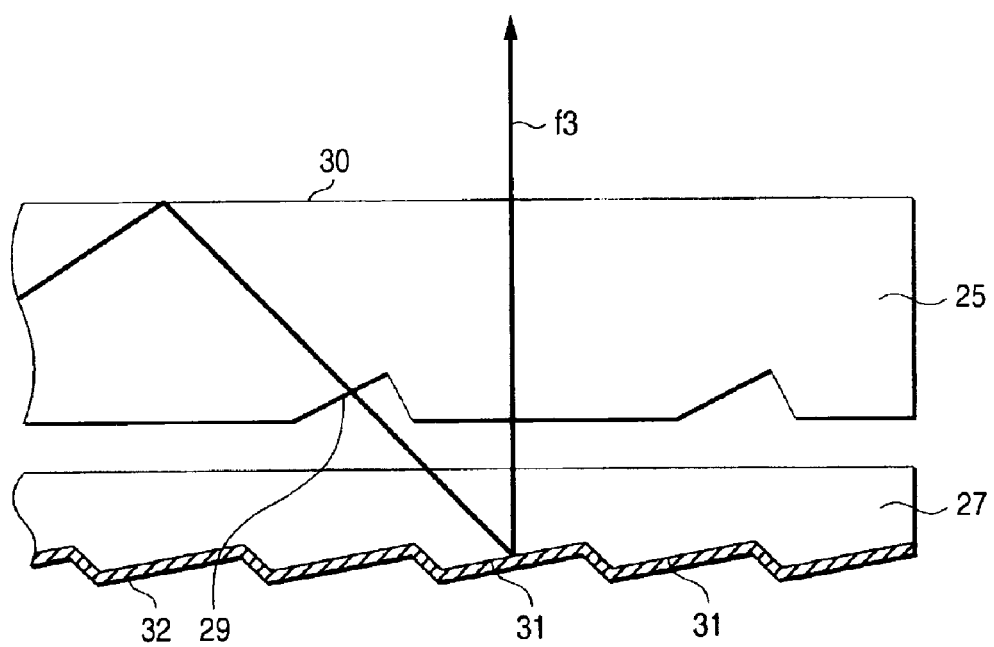
FIG. 16 is a view showing a behavior of light leaked from a rear face of a light guide plate reflected by a prism sheet and incident on inside of the light guide plate again.

Further, as shown by FIG. 16, light passing the diffusing pattern 29, or passing a flat portion at which the diffusing pattern 29 is not present and emitted skewedly from the rear face of the light guide plate 25, enters inside of the prism sheet 27 and is reflected by the reflecting face 32. A shape of the lower face of the prism sheet 27 (angle of the recessed and projected pattern 31 or the like) is designed such that light reflected by the reflecting face 32 in this way, is reflected in a direction orthogonal to the prism sheet 27. Therefore, light reflected by the prism sheet 27, passes the light guide plate 25 and is emitted from the light emitting face 30 of the light guide plate 25 in a direction substantially orthogonal to the light emitting face 30. As described above, light at inside of the light guide plate 25 is provided with the narrow directivity in the circumferential direction of the concentric circle centering on the light emitting portion 26 and therefore, also light emitted skewedly from the lower face of the light guide plate 25 is also provided with narrow directivity in the circumferential direction, and light having the narrow directivity is reflected by the reflecting face 32 of the prism sheet 27 and therefore, loss of light from the lower face of the light guide plate 25 can be minimized and light can be emitted from the upper face of the light guide plate 25 similarly with narrow directivity.

Further, according to the prism sheet 27, the recessed and projected patterns 31 are formed in the shape of the concentric circles centering on the light emitting portion 26 in conformity with the diffusing patterns 29 of the light guide plate 25 and therefore, an amount of light reflected by the prism sheet 27 is made uniform in the face.

Figure 17:
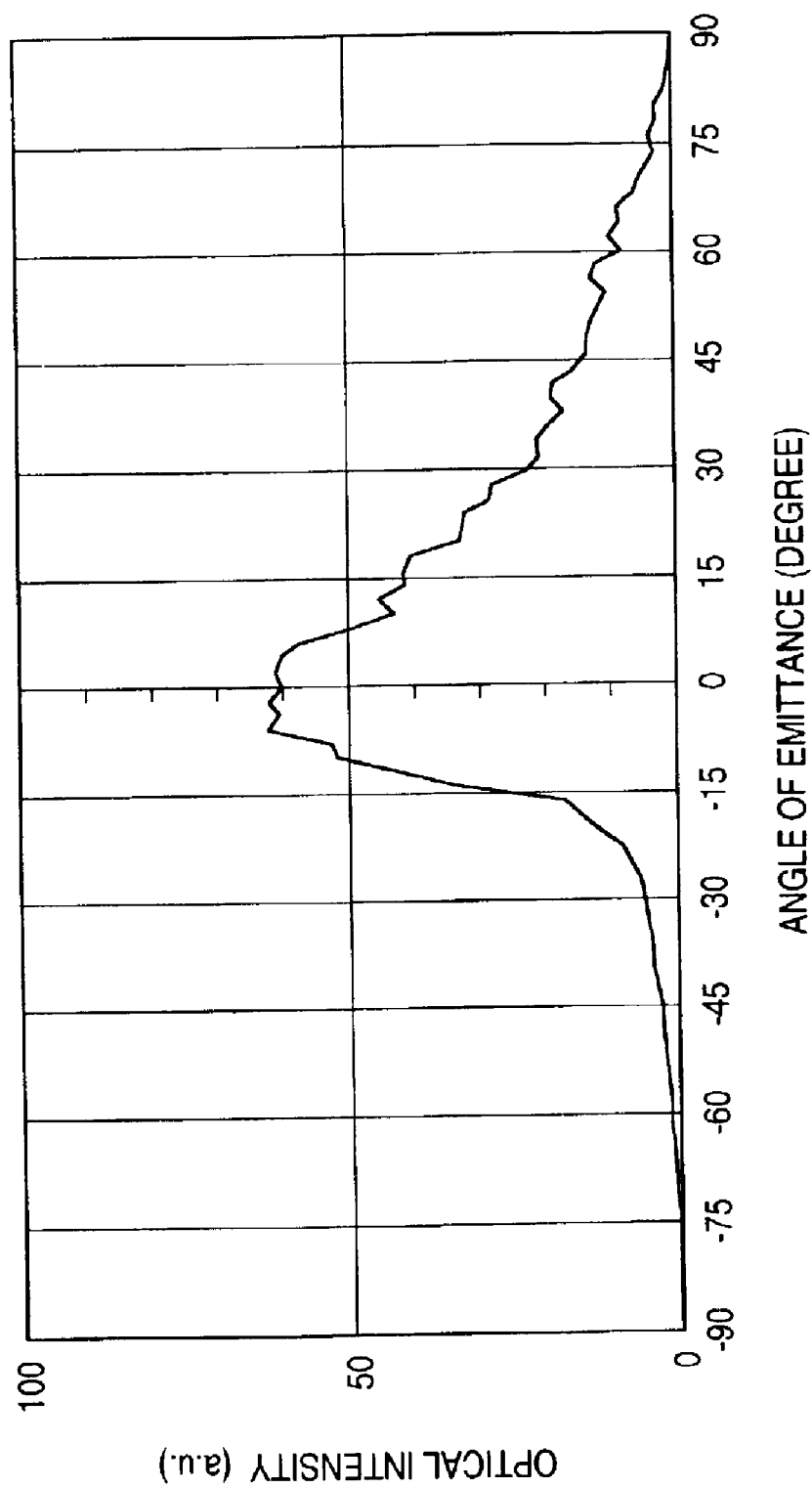
FIG. 17 is a diagram showing a directing property of light reflected by a diffusing pattern of a light guide plate and emitted from an upper face of the light guide plate.

Light f3 reflected by the diffusing pattern 29 and emitted from the upper face of the light guide plate 25, is emitted in a direction substantially orthogonal to the light guide plate 25 (FIG. 13) and its directing characteristic is shown by FIG. 17. Incidentally, in FIG. 17, the abscissa designates an angle of light ray relative to the direction orthogonal to the surface of the light guide plate 25 produced by viewing the light guide plate 25 from a side face thereof and the ordinate designates an optical intensity represented by an arbitrary unit (a.u.). As shown by FIG. 17, 55% of a total amount of light emitted from the upper face of the light guide plate 25, is included in a viewing angle 30° (±15°) regarded to be easy to see an image.

Figure 18:
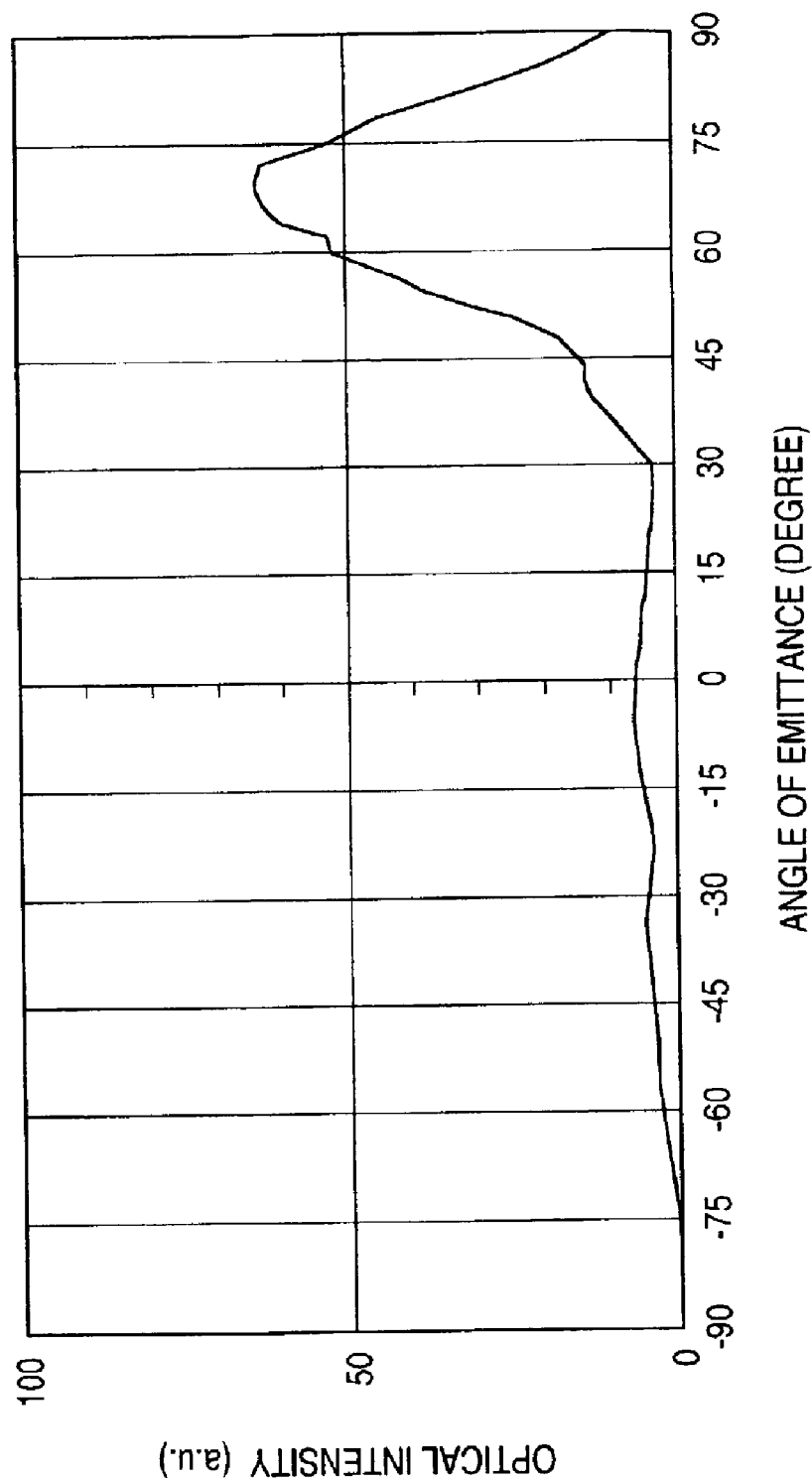
FIG. 18 is a diagram showing a directing property of light emitted from a rear face of the light guide plate.
Figure 19:
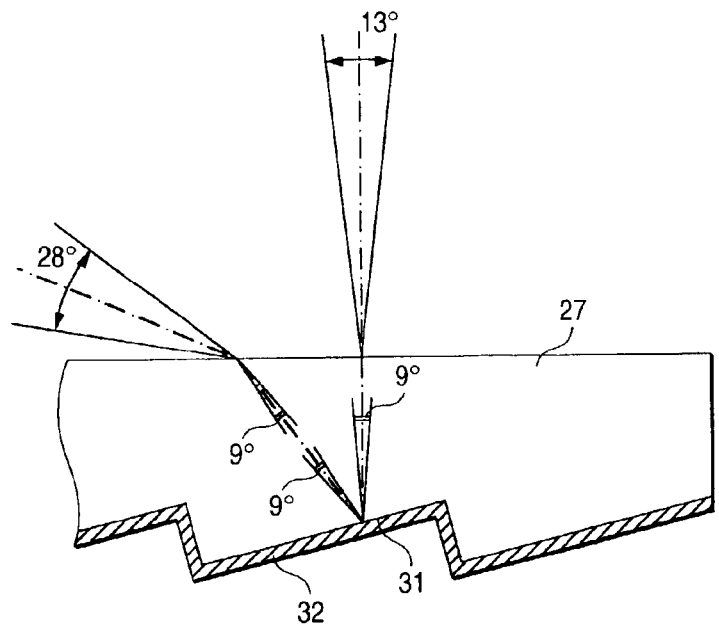
FIG. 19 is a view showing directing angles of light emitted from a lower face of a light guide plate and incident on a prism sheet, light at inside of the prism sheet and light emitted from an upper face of the prism sheet.

In contrast thereto, light transmitting the diffusing pattern 29, or transmitting a flat portion which is not provided with the diffusing pattern 29, and emitted from the rear face of the light guide plate 25, is skewedly emitted to the rear face of the light guide plate 25 as shown by FIG. 16, and its directing characteristic is shown by FIG. 18. Incidentally, in FIG. 18, the abscissa designates an angle θ of light ray relative to the direction orthogonal to the rear face of the light guide plate 25 produced by viewing the light guide plate from a side face thereof, and the ordinate designates an optical intensity represented by an arbitrary unit (a.u.). As shown by FIG. 18, inclination of light emitted from the lower face of the light guide plate 25, is about 68° and a half value angle thereof is as narrow as 28°. Therefore, when light emitted from the lower face of the light guide plate 25 is incident on the prism sheet 27, light having a spreading angle of 28° is incident thereon by an angle of incidence near to 90°, and as shown by FIG. 19, light incident on the prism sheet 27, becomes light having a very narrow directing angle of 9° by being refracted by the interface (upper face) of the prism sheet 27, reflected by the reflecting face 32 while maintaining the directing angle and is emitted from the upper face of the prism sheet 27 as light having a narrow directing angle of 13°.

Figure 20:
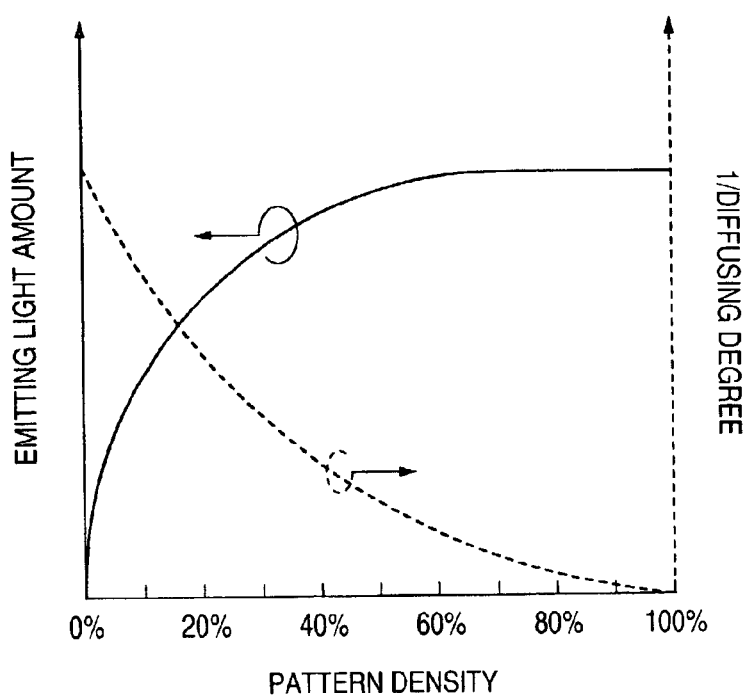
FIG. 20 is a diagram showing a relationship between a pattern density of a diffusing pattern provided at a rear face of a light guide plate and an amount of light emitted from the light guide plate (emitting light amount) as well as an inverse number of a diffusing degree.

Although also light reflected by the diffusing pattern 29 of the light guide plate 25, is emitted in the direction substantially orthogonal to the light emitting face 30, a function (narrow directivity) for aligning and emitting reflected light in the direction substantially orthogonal to the light emitting face 30, is more excellent in the case of the prism sheet 27 than in the case of the diffusing pattern 29. Therefore, although as shown in FIG. 20, the larger the pattern density of the diffusing pattern 29 provided at the rear face of the light guide plate 25, the more increased is the light amount emitted from the light guide plate 30 (emitting light amount), a diffusing degree of light emitted from the light emitting face 30 is increased and the directivity is widened. Therefore, in order to narrow the directivity of light emitted from the light guide plate 25, it is preferable that the pattern density of the diffusing pattern 29 is equal to or smaller than 40%. Meanwhile, in order to maintain the emitting light amount, it is preferable that the pattern density is equal to or larger than, for example, 10%. Therefore, it is preferable that the diffusing patterns 29 of the light guide plate 25 are not distributed so densely but is distributed discretely to thereby produce flat portions among the diffusing patterns 29.

When the brightness of the plane light source apparatus 24 according to the invention placing the prism sheet 27 on the rear face of the light guide plate 25, brightness of a plane light source apparatus of Comparative Example 1 placing a while color scatting sheet on the rear face of the light guide plate and the brightness of the plane light source apparatus of Comparative Example 2 placing a mirror face reflecting sheet on the rear face of the light guide plate, are compared the following result is obtained.

| | |
|---|---|
| Prism sheet (The Invention) | 175 a.u. |
| While color scattering sheet (Comparative Example 1) | 100 a.u. |
| Mirror face reflecting sheet (Comparative Example 2) | 104 a.u. |

According to the result, the plane light source apparatus 24 of the invention is about 1.75 times as bright as the normal plane light source apparatus of Comparative Example 1 and Comparative Example 2.

Although according to the liquid crystal display apparatus 21 of the invention, the diffusing plate 23 is not necessarily needed, when the directivity of light emitted from the plane light source apparatus 24 is excessively narrow, the directivity can be adjusted by placing the diffusing plate 23 between the plane light source apparatus 24 and the liquid crystal display panel 22.

Further, according to the liquid crystal display apparatus 21 of the invention, the prism sheet 27 is placed at a position remotest from the liquid crystal display panel 22 and therefore, even when there is a defect having a size of about 0.2 mm on the prism sheet 27, the defect is difficult to see and yield in fabricating the plane light source apparatus 24 is promoted.

Further, according to the liquid crystal display apparatus 21 of the invention, there is produced a distance of about 1 mm between the liquid crystal display panel 22 and the prism sheet 27 and therefore, Moire fringes are difficult to be brought about between the liquid crystal display panel 22 and the prism sheet 27. Further, since the recessed and projected pattern 31 of the prism sheet 27 is directed to a side opposed to the light guide plate 25, there is a distance of about 0.1 mm between the diffusing pattern 29 of the light guide plate 25 and the recessed and projected patterns 31 of the prism sheet 27 and also Moire fringes produced by interference between the diffusing pattern 29 and the recessed and projected patterns 31 is difficult to be brought about.

(Second Embodiment)

Figure 21:
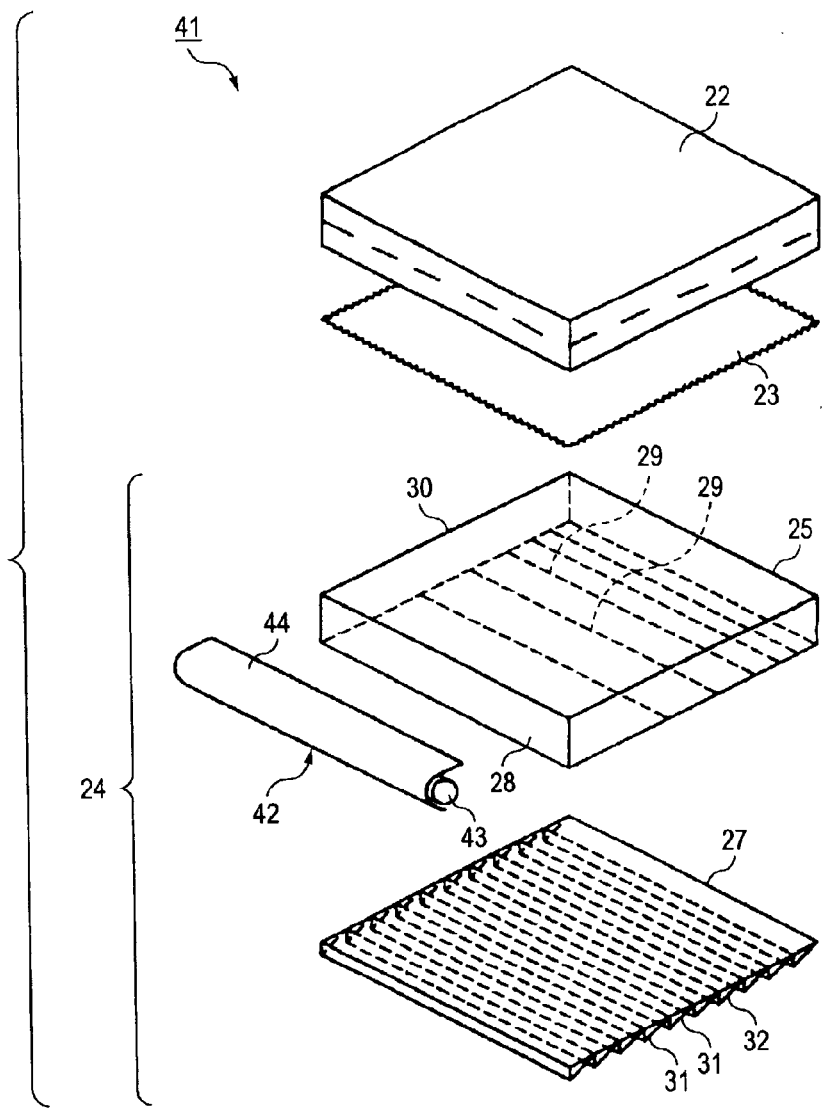
FIG. 21 is a disassembled perspective view showing a structure of a liquid crystal display apparatus according to other embodiment of the invention.

FIG. 21 is a disassembled perspective view showing a structure of a liquid crystal display apparatus 41 according to other embodiment of the invention. According to the liquid crystal display apparatus 41, a line light source 42 is used as a light emitting portion. The plane light source apparatus 24 is arranged on a lower side of the liquid crystal display panel 22 and the diffusing plate 23, the line light source 42 comprises a fluorescent tube 43 and a reflector 44 and the line light source 42 is made to be opposed to the light incident end face 28 of the light guide plate 25 substantially over a total length thereof. Further, in correspondence with use of the line light source 42, the lower face of the light guide plate 25 is formed with the diffusing patterns 29 aligned in parallel with the line light source 42. Further, in correspondence with the diffusing patterns 29 of the light guide plate 25, also the recessed and projected patterns 31 of the prism sheet 27 having a section in a triangular shape, are formed in parallel with the line light source 42 at constant pitches. Even in such the plane light source apparatus 24, light can be emitted in a narrow viewing angle and the efficiency of utilizing light can be increased. Further, similar to the case of the first embodiment, Moire fringes can be prevented and a defect of the prism sheet 27 is made to be difficult to see.

Further, also according to the light guide plate 25, the pattern density of the diffusing pattern 29 is small at a vicinity of the line light source 42 and the remoter from the line light source 42, the larger the pattern density becomes gradually. Therefore, also in the plane light source apparatus 24, the brightness distribution of the light emitting face 30 can be made to be uniform.

Figure 22:
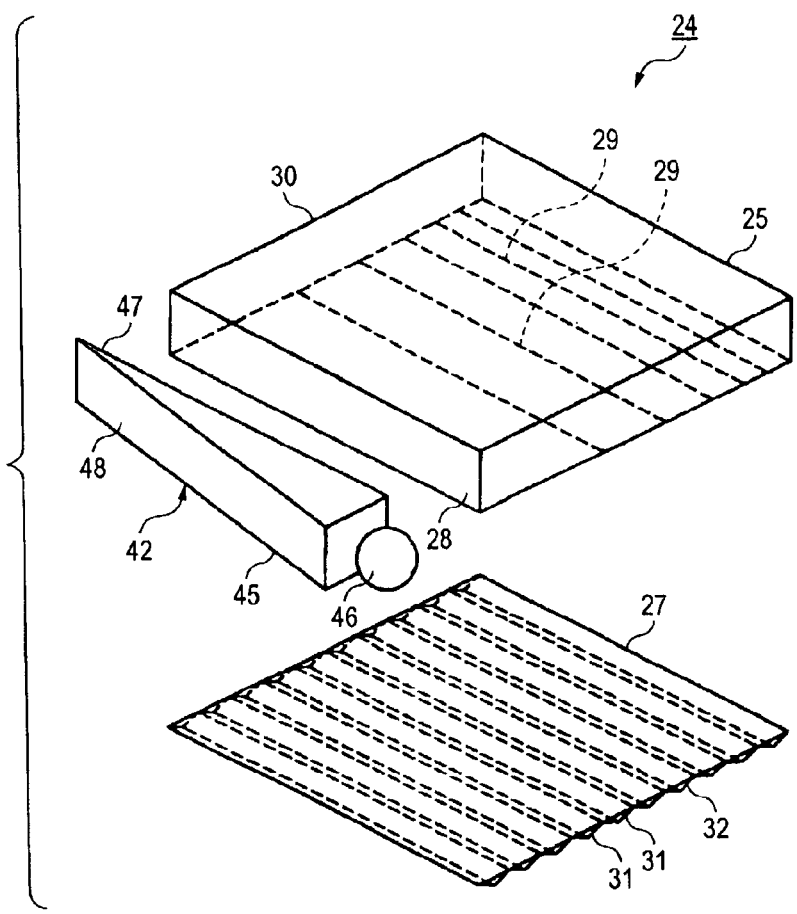
FIG. 22 is a perspective view showing a liquid crystal display apparatus using a light emitting portion converting light of a point light source to light of a line light source.

Also according to a plane light source apparatus shown in FIG. 22, the line light source 42 is used as a light emitting portion, and according to the line light source 42, a light emitting portion is constituted by light of a point light source 46 converted into the line light source 42. That is, the line light source 42 is constituted by the point light source 46 of a light emitting diode or the like and a light guide member 45 formed in a wedge-like shape, and the point light source 46 is arranged to be opposed to an end face of the light guide member 45. The light guide member 45 is molded by a transparent resin having a high diffractive index of polycarbonate resin or methacrylic resin, a face (hereinafter, referred to as front face) 47 opposed to the light incident end face 28 of the light guide plate 25, is made to be in parallel with the light incident end face 28, other face (hereinafter, referred to as rear face) 48 is inclined to the light incident end face 28 and the remoter from the point light source 46, the narrower the width of the light guide member 45 becomes gradually.

Further, light emitted from the point light source 46, enters inside of the light guide member 45 from the end face of the light guide member 45, progresses while repeating reflection by the two faces 47 and 48 of the light guide member 45 and reflected by the rear face 48 to thereby reduce an angle of incidence to the front face 47. When the angle of incidence to the front face 47 becomes smaller than the critical angle of total reflection, the light is emitted from the front face 47 of the light guide member 45. In this way, light is emitted from a total of the front face 47 of the light guide member 45 substantially uniformly and light is made to be incident on inside of the light guide plate 25 from the total of the light incident end face 28 of the light guide plate 25.

(Third Embodiment)

Figure 23:
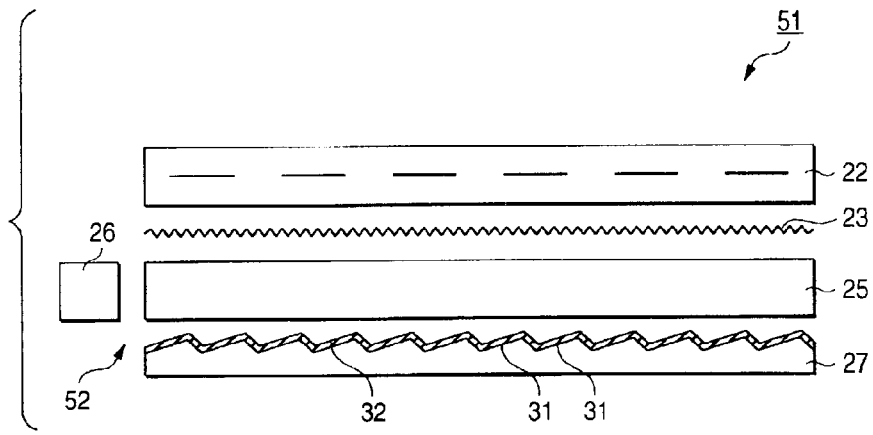
FIG. 23 is a outline side view showing a liquid crystal display apparatus according to still other embodiment of the invention.

FIG. 23 is an outline side view showing a liquid crystal display apparatus 51 according to still other embodiment of the invention. According to the embodiment, a surface (face on a side opposed to the light guide plate 25) of the prism sheet 27 is formed with the recessed and projected patterns 31, and the reflecting face 32 is formed at a surface thereof by vapor deposition of metal. When the reflecting face 32 is provided on the surface of the prism sheet 27, although the vertical brightness is reduced, since a viewing angle is regarded to be easy to see when the prism sheet 27 is 30° (±15°), about 70% of light of a total of reflected light is brought into the viewing angle and a plane light source apparatus 52 is sufficiently effective.

Figure 24:
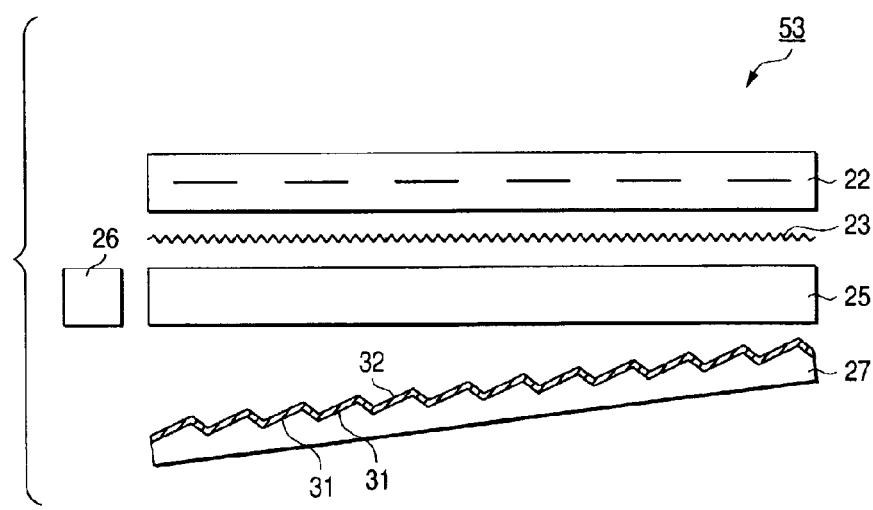
FIG. 24 is an outline side view showing a liquid crystal display apparatus arranging a prism sheet to incline skewedly.

Further, when a direction of light reflected by the reflecting face 32 of the prism sheet 27 is not orthogonal to the prism sheet 27, the prism sheet 27 may be inclined relative to the light guide plate 25 such that light is reflected orthogonally to the light guide plate 25 as in a liquid crystal display apparatus 53 shown in FIG. 24.

According to the plane light source apparatus, an optical sheet for reflecting light emitted from a rear face of a light guide plate in a skewed direction and making the light incident on the rear face of the light guide plate orthogonally thereto, is arranged opposedly to the rear face of the light guide plate and therefore, light leaked from the rear face of the light guide plate can be reflected into a viewing angle, light which has been reflected to outside of the viewing angle in the related art can also be condensed into the viewing angle and the efficiency of utilizing light can be increased.

Further, according to the plane light source apparatus, when the plane light source apparatus is arranged on a rear side of an image display panel, since the optical sheet is disposed at a position remotest from the image display panel, even when there is a defect on the optical sheet, the defect becomes difficult to see and Moire fringes are difficult to be brought about between the image display panel and the optical sheet.

What is claimed is:

1. A plane light source apparatus comprising:
   a light source; and
   a light guide plate for confining light from the light source and emitting the light from a surface thereof;
   wherein an optical sheet for reflecting light emitted from a rear face of the light guide plate in a skewed direction and making the light incident on the rear face of the light guide plate again orthogonally to the rear face is arranged opposite to the rear face of the light guide plate,
   wherein the optical sheet is formed with a recessed and projected pattern on a face thereof on a side opposed to a face thereof opposed to the light guide plate, and the face formed with the recessed and projected pattern defines a light reflecting face,
   wherein the rear face of the light guide plate is discretely formed with a diffusing pattern for reflecting light in the light guide plate, and the light reflected by the diffusing pattern is emitted from the surface of the light guide plate in a direction substantially orthogonal to the surface of the light guide plate, and
   wherein a directing angle of the light reflected by the optical sheet and then emitted from the light guide plate is narrower than a directing angle of the light reflected by the diffusing pattern and then emitted from the light guide plate.

2. The plane light source apparatus according to claim 1, wherein the light reflecting face is produced by forming a metal thin film on the face formed with the recessed and projected pattern.

3. The plane light source apparatus according to claim 1, wherein the light reflected by the optical sheet and made incident on the rear face of the light guide plate again, is emitted from a surface of the light guide plate in a direction substantially orthogonal to the surface of the light guide plate.

4. The plane light source apparatus according to claim 1, wherein the light source is a light source extended along an end face of the light guide plate and the recessed and projected pattern formed at the optical sheet is a pattern in parallel with the light source.

5. The plane light source apparatus according to claim 1, wherein the light source is a point light source and the recessed and projected patterns formed at the optical sheet and diffusing patterns formed at the light guide plate are respectively arranged in a shape of concentric circles centering on the light source.

* * * * *